Sept. 11, 1962  F. M. MATTHEWS ETAL  3,053,482
NACELLE AND STRUCTURE COOLING SYSTEM FOR
USE WITH EJECTOR TYPE VTOL AIRCRAFT
Filed Aug. 23, 1961  3 Sheets-Sheet 1

INVENTORS.
FLORENCE M. MATTHEWS
HAL D. STRIBLING
BY
Agent

Sept. 11, 1962    F. M. MATTHEWS ETAL    3,053,482
NACELLE AND STRUCTURE COOLING SYSTEM FOR
USE WITH EJECTOR TYPE VTOL AIRCRAFT
Filed Aug. 23, 1961    3 Sheets-Sheet 2

INVENTORS.
FLORENCE M. MATTHEWS
HAL D. STRIBLING
BY
George C. Sullivan
Agent

Sept. 11, 1962   F. M. MATTHEWS ETAL   3,053,482
NACELLE AND STRUCTURE COOLING SYSTEM FOR
USE WITH EJECTOR TYPE VTOL AIRCRAFT
Filed Aug. 23, 1961   3 Sheets-Sheet 3

INVENTORS.
FLORENCE M. MATTHEWS
HAL D. STRIBLING
BY
Agent

United States Patent Office
3,053,482
Patented Sept. 11, 1962

3,053,482
NACELLE AND STRUCTURE COOLING SYSTEM FOR USE WITH EJECTOR TYPE VTOL AIRCRAFT
Florence M. Matthews, Marietta, and Hal D. Stribling, Atlanta, Ga., assignors to Lockheed Aircraft Corporation, Burbank, Calif.
Filed Aug. 23, 1961, Ser. No. 133,493
2 Claims. (Cl. 244—23)

This invention relates to aircraft cooling systems, and more particularly a novel arrangement to provide a sufficient cooling airflow for both a powerplant nacelle or compartment and fuselage structure adjacent hot propulsive fluid handling members in an aircraft propulsion system.

A type of aircraft installation contemplated for this invention is as shown and described in copending application Serial Number 57,656, entitled "Aircraft Propulsion System" and assigned to the same assignee as this application.

In turbo-jet powered S/VTOL (short take-off and landing or vertical take-off and landing) aircraft having a cooling airflow through the engine compartment or nacelle during normal horizontal flight, such cooling airflow drops off considerably during hover and/or relatively slow forward velocities. As recognized by those skilled in the art to which this invention pertains, this cooling airflow is over or past those portions of the propulsion system structure whose temperature becomes elevated during operation; the function of the cooling airflow being to reduce or eliminate heat transfer from the propulsion system structure at elevated temperature to surrounding or adjacent airframe structure. To accomplish a sufficient cooling airflow during hover and/or slow forward velocities a previous arrangement was accomplished by the addition of a fan or blowing means to provide or augment a cooling airflow. However, this is objectionable as it results in weight and space penalties, and in some cases may require utilization of power extraction from the powerplant to provide the cooling airflow.

Accordingly, it is an object of this invention to provide an arrangement for airflow cooling of engine nacelles in an aircraft capable of operating in a normal horizontal flight regime as well as in STOL and/or VTOL flight regimes.

Another object of this invention is to provide such airflow cooling of engine nacelles without necessitating additional equipment such as fan or blower devices.

A further object of this invention is to provide cooling for sidewalls of vertically directed ejectors through which hot combustion gases are directed for vertical propulsive thrust.

It is still another object of this invention to provide an arrangement for combined airflow cooling of engine nacelles and vertical ejector sidewalls which is relatively simple and inexpensive and without penalties of additional equipment, weight or powerplant losses due to power extraction.

Other objects and advantages will become apparent from the following description taken in connection with the accompanying drawings showing one of the embodiments of the invention in which.

Generally stated, the invention comprises the location of slots or openings in the sidewalls of jet pump ejector passages, the openings or passages providing an airflow path from a location exterior of the ejector passage whereby the main flow through the ejector passage will aspirate air from the remote locations. By proper arrangement of this air path into the main ejector passages, a continuous flow of cooling air can be directed through compartments or against surfaces to perform cooling by either an impingement or scrubbing type action.

Figure 1:
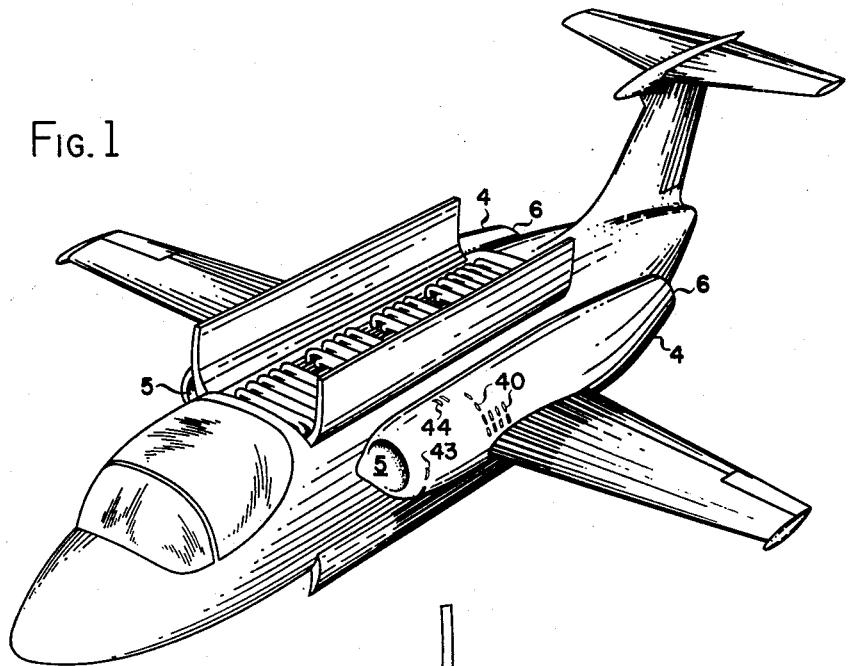
FIGURE 1 is a perspective view of a VTOL aircraft incorporating this invention.
Figure 3:
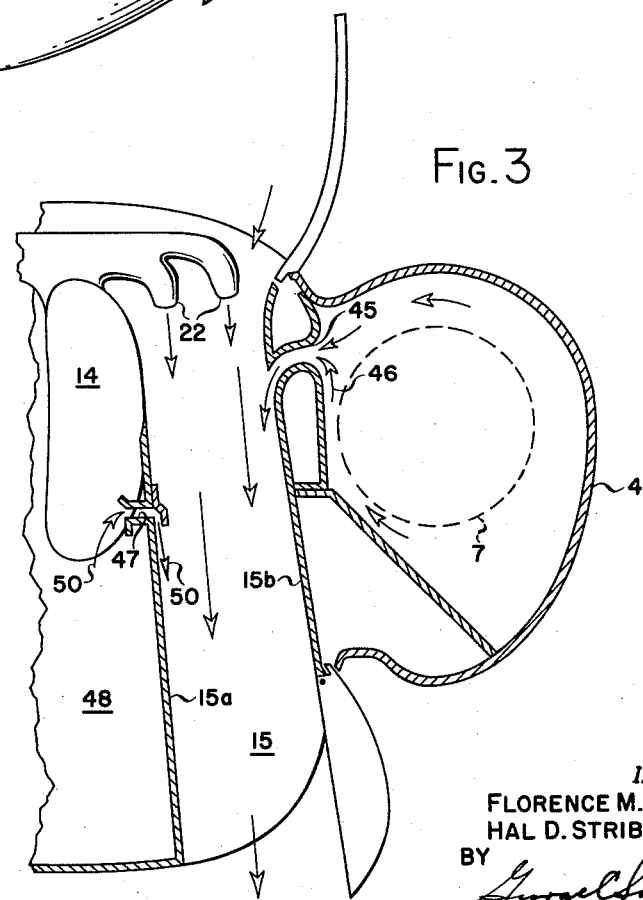
FIGURE 3 is a transverse cross-sectional view of a portion of the fuselage and powerplant nacelle of the aircraft shown in FIGURE 1.
Figure 4:
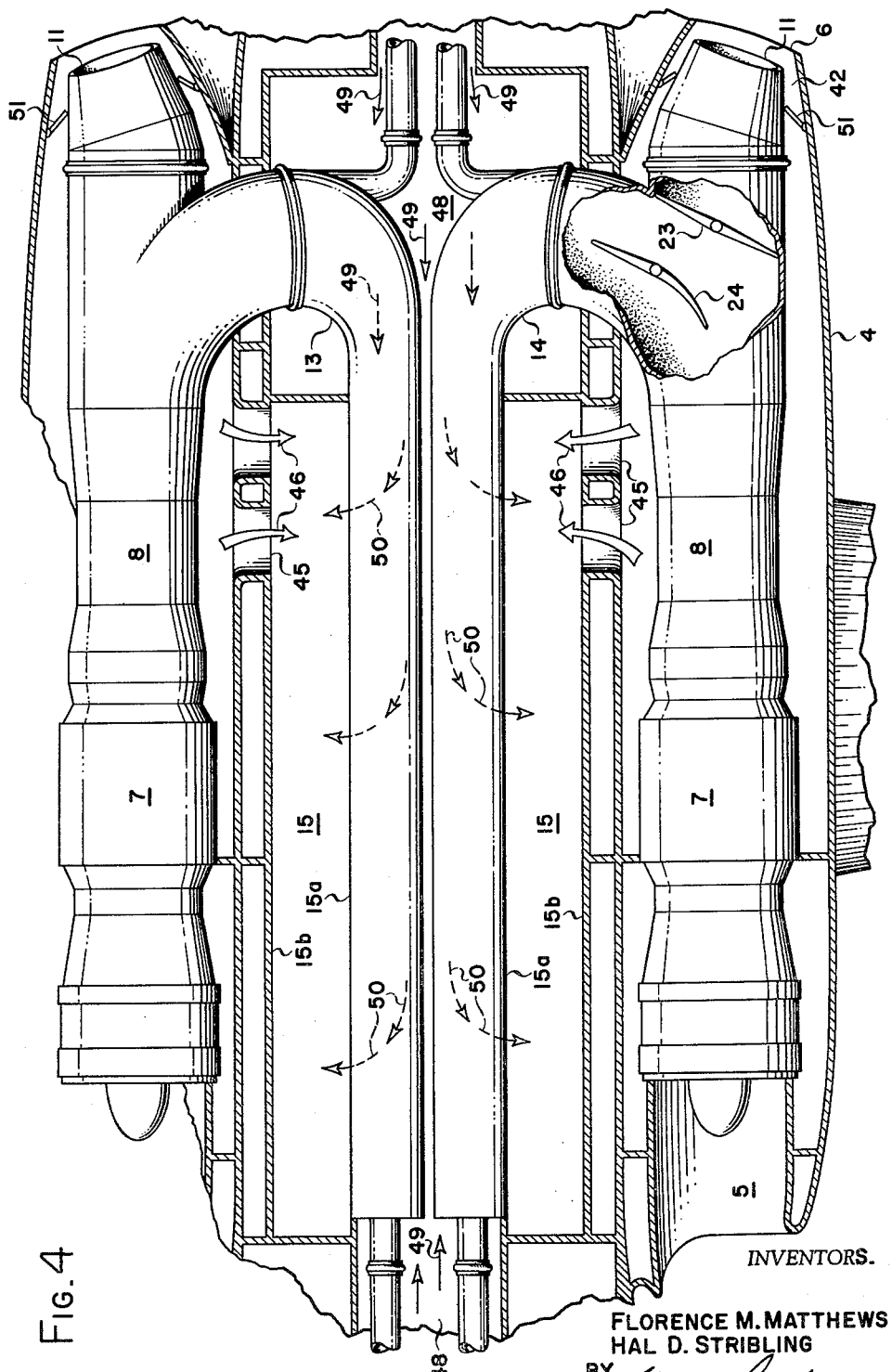
FIGURE 4 is a partial cross-sectional plan view showing both the propulsion gas and cooling airflow systems of the aircraft shown in FIGURE 1.

More specifically, in FIGURES 1, 3 and 4, the propulsion system of the depicted embodiment of the invention is as shown in copending application Serial Number 57,656 identified above, wherein powerplant nacelles 4 on the aircraft have an air inlet 5 and exhaust outlet 6. Located within each nacelle 4 is a turbo-jet powerplant 7 arranged to receive air from the inlet 5 and to discharge its combustion products through tailpipe 8 and propulsive jet nozzle 11.

By operation of a pair of valves 23 and 24 in tailpipe 8 of each engine, the combustion products from each powerplant 7 may be directed straight aft through nozzle 11 or may be diverted into a duct 13 or 14 which extends substantially parallel with the powerplant 7 on the inboard side as can best be seen in FIGURE 4. When the propulsive gases of powerplant 7 are thus directed into ducts 13 and 14, they are exhausted in a downward direction through a plurality of crossover tubes and primary nozzles 22 into downwardly directed ejector passages 15; this deliverance of the combustion products from the ducts 13 and 14 into the ejector passages 15 being more clearly explained and claimed in copending application Serial Number 88,571, entitled "Aircraft Propulsion Distribution System" and assigned to the same assignee as this case.

Figure 2:
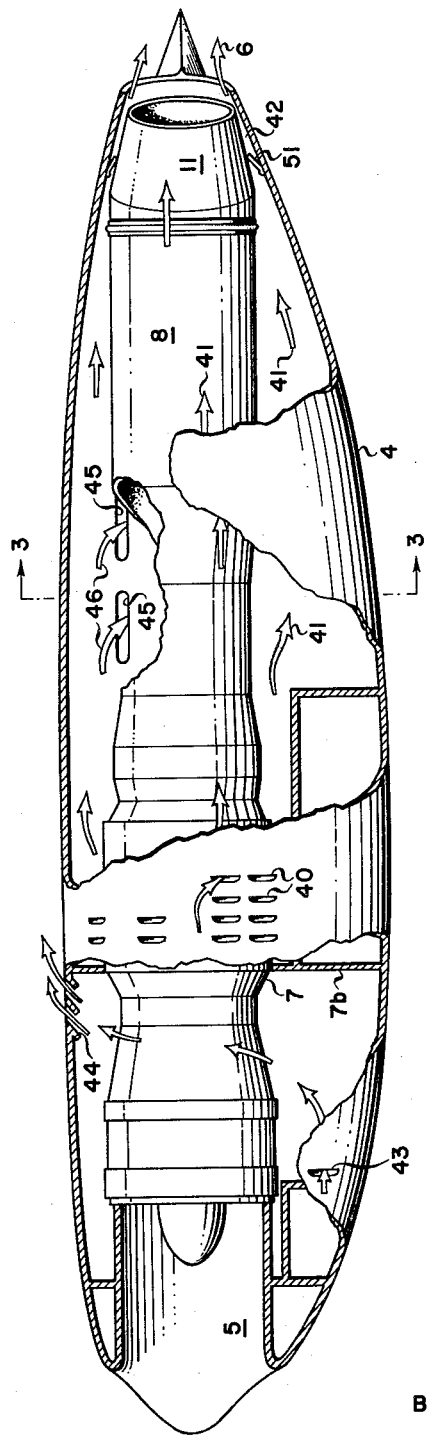
FIGURE 2 is a partial cross-sectional elevation view of one of the powerplant nacelles of the aircraft shown in FIGURE 1.

In order to provide a cooling airflow for the engine compartment and nacelle structures during normal horizontal flight, the normal arrangement is to provide for a plurality of openings 40 in any appropriate or desired locations in the outer surface or wall of the nacelles 4, which can best be seen in FIGURES 1 and 2. In normal horizontal flight air flowing into the openings 40 will flow along and around the engine in a direction shown by flow arrows 41 and through a gap or passage 42 between the nozzle 11 and outer surface or structure of nacelle 4 whereupon the cooling airflow mixes with the hot combustion gases being discharged from nozzle 11. In this manner, the propulsive efflux from nozzle 11 serves as the primary flow of a jet pump with the cooling air functioning as the secondary flow.

In some installations a firewall 7b is contained within a nacelle to prevent passage of hot air surrounding the combustion section of a turbo-jet powerplant from moving forward to the compressor section. In this case, a normal cooling flow arrangement is for the provision of inlet openings 43 at a position substantially forward of the longitudinal location of a firewall 7b with outlet openings 44 immediately preceding the longitudinal location of the firewall, as can best be seen in FIGURES 1 and 2.

In an aircraft of the VTOL or STOL type of operation, whenever there is insufficient flow of cooling air through the engine compartment or nacelle 4, a substantial temperature rise is occasioned therein unless an appropriate or similar type airflow is maintained through the compartment. To accomplish an airflow through the nacelle structure and engine compartment there is provided a plurality of passages 45 leading from the compartment of nacelle 4 into ejector 15. In this arrangement, the mixture of primary air from nozzles 22 and secondary ambient air from the upper exterior or surface of the fuselage serves as the primary flow of a second jet pump, the secondary flow of the second jet pump being the cooling airflow entering the compartment of nacelle 4 through passages 40 and exiting therefrom through passages 45 as indicated by flow arrows 46. This secondary air or flow entering ejector passages 15 through the openings 45 should be somewhat cooler than the primary flow which contains the hot combustion gases and accordingly will provide some cooling effect on the outer wall 15b of ejector passage 15.

With longitudinal ducts 13 and 14 also carrying hot combustion gases, a similar cooling flow arrangement may be provided on the inner ejector passage walls 15a and the compartment or spacing therebetween. This similar arrangement may be accomplished by providing a plurality of passages or openings 47 in the inner walls 15a of the ejector passage 15 whereby the jet pump action of the main flow through ejectors 15 will aspirate air from the compartment 48 in which the longitudinal ducts 13 and 14 are contained. The cooling air may be introduced into the compartment 48 from either or both ends so that such air will flow toward the openings 47 as best shown by flow arrows 49 in FIGURE 4. As the airflow approaches openings 47 it will be aspirated into ejectors 15 to the lowering of pressure at the openings 47 by the main flow through the ejectors 15, this flow of the cooling air through openings 47 being best indicated by flow arrows 50 in FIGURES 3 and 4.

Referring now to FIGURES 2 and 4, if desired, any type of appropriate valve arrangement or valve device 51 may be incorporated to control the passage of the cooling or secondary airflow through passage 42 so as to prevent, for example, the ingestion of any hot exhaust gases from nozzle 11 from flowing in a reverse direction into the cooling airflow for passages through openings 45 into the main ejector passages 15 in the case of extremely slow forward speeds in which a small amount of the combustion products will flow through nozzle 11 due to the slight opening of the diverter valve 23. In this arrangement any type of valving arrangement may be incorporated such as leaf or petal type structures, and any appropriate actuation means (not shown) as desired may be utilized, it being further understood, for example, that such actuation means could be interconnected with the actuation and control means of valves 23 and 24 so that upon diversion of the combustion products from nozzle 11 into longitudinal ducts 13 and 14, the airflow controlling or valve devices 51 may be partially or completely closed.

In operation, during normal horizontal flight, a cooling airflow is provided in the engine compartments or nacelle structures 4 by an airflow being aspirated through the compartment by the jet pump action of propulsive efflux from nozzles 11, the cooling airflow being aspirated from the compartment through gap or passage 42 through the jet pump principle. The cooling airflow is supplied to the compartment by entrance through passages or openings 40 which permit the ambient exterior air to enter the compartment due to the reduced pressure therein. During operation of the vertical thrust producing portion of the propulsive system, the cooling airflow is aspirated from the nacelle compartment 4 through passages 45 leading from the compartment into the ejector passages 15. In this regime of operation the annular gap 42 between the structure of nacelle 4 and nozzle 11 may be closed off or controlled by any appropriate valve arrangement or device 51.

Likewise during vertical thrust operation, a cooling airflow may be provided for the interior compartment 48 by a second set of openings or passages located on the interior ejector passage walls 15a whereby the propulsive propulsion producing flow through the ejector passage 15 will aspirate air from compartment 48 through passages 45 through a jet pump principle.

Thus as can be seen, this invention provides a unique and novel cooling arrangement provided by a flow of cooling air over or past structural components and parts subject to high or elevated temperatures, such cooling capacities being provided through a relatively simple and expedient arrangement that does not involve nor require additional operating equipment and weight penalties therefrom.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. In an aircraft having a turbo-powerplant in a compartment and arranged to direct propulsive fluids either aft for horizontal thrust or downward through a vertically directed ejector passage for vertical thrust, a cooling system arrangement comprising first openings in sidewalls of the compartment for entrance of ambient air, a first air exit from the compartment directed in an aftward direction, said first exit arranged adjacent the propulsive fluid discharge nozzle of the powerplant whereby said embient air is aspirated from the compartment by the horizontal thrust producing aftward efflux of the powerplant, and second air exits from the compartment directed to the vertically directed ejector passage whereby said ambient air is aspirated from the compartment by the vertical thrust producing efflux of the powerplant directed downwardly through the vertically directed ejector.

2. In an aircraft having a turbo-powerplant arranged to direct propulsive fluids either aft for horizontal thrust or downward through a vertically directed ejector for vertical thrust, a vertically directed ejector sidewall cooling system arrangement comprising at least one slot in the ejector sidewall, said slot connected to and serving as exit from a source of supply of air cooler than the propulsive flow through the ejector, said cooler air being aspirated into the ejector passage by the vertical thrust producing flow through the vertically directed ejector to flow downwardly over the ejector sidewall.

References Cited in the file of this patent

UNITED STATES PATENTS 2,973,922    Davidson _____ Mar. 7, 1961

FOREIGN PATENTS 1,199,711    France _____ June 22, 1959